M. CLARK.
SAFETY DEVICE FOR MOTOR DRIVEN ROAD VEHICLES.
APPLICATION FILED JAN. 4, 1913.
1,127,406.
Patented Feb. 9, 1915.
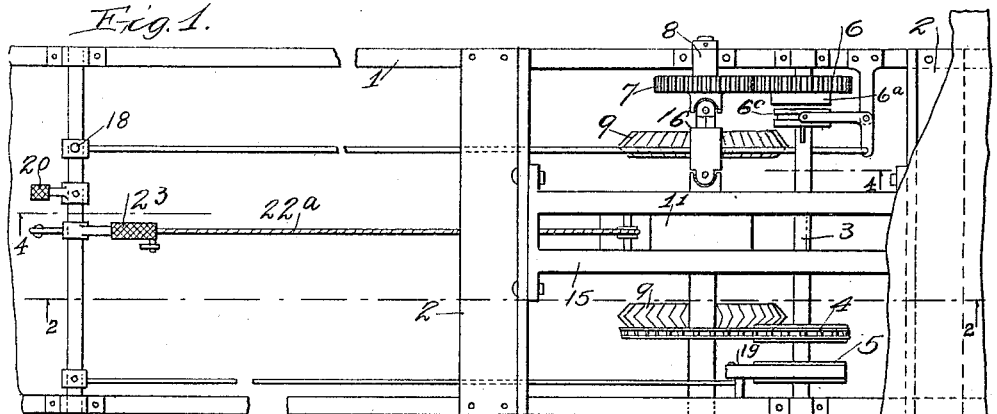
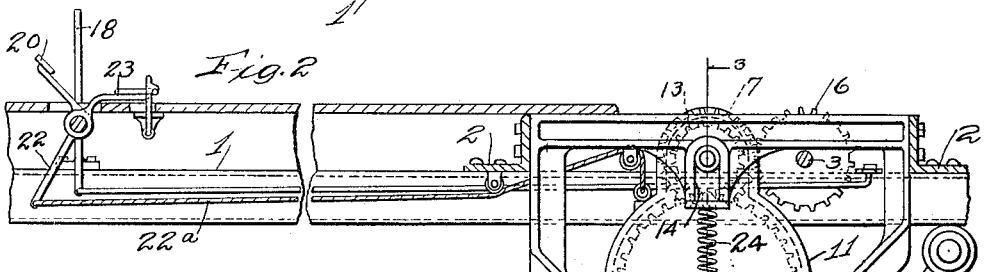
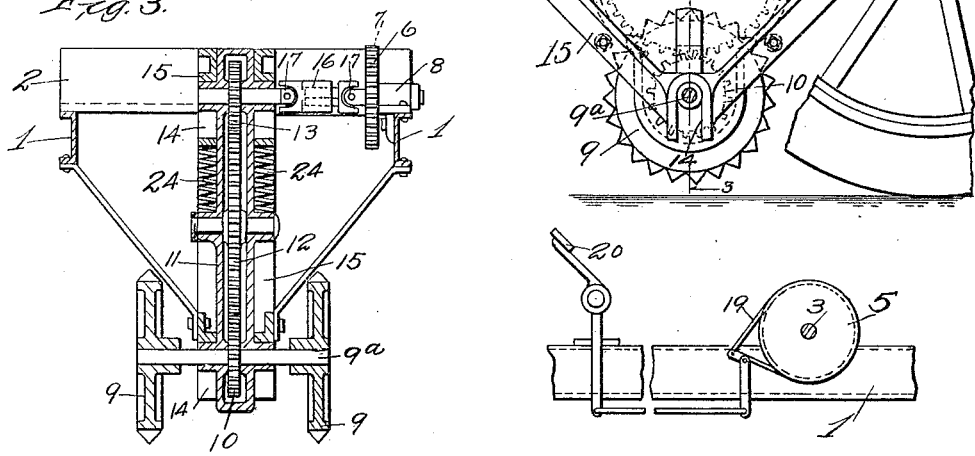
Witnesses:
Inventor:
Melville Clark.
by Burton & Burton
his Att'ys.

UNITED STATES PATENT OFFICE.

MELVILLE CLARK, OF CHICAGO, ILLINOIS.

SAFETY DEVICE FOR MOTOR-DRIVEN ROAD-VEHICLES.

1,127,406.  Specification of Letters Patent.  Patented Feb. 9, 1915.

Application filed January 4, 1913. Serial No. 740,154.

*To all whom it may concern:*

Be it known that I, MELVILLE CLARK, a citizen of the United States, residing at Chicago, in the county of Cook and State of Illinois, have invented new and useful Improvements in Safety Devices for Motor-Driven Road-Vehicles, of which the following is a specification, reference being had to the accompanying drawings, forming a part thereof.

The purpose of this invention is to provide an improved means for preventing skidding of an automobile or other motor-driven vehicle, adapted also to serve the purpose of an emergency brake and for assisting hill climbing or other heavy service.

It consists in the elements and features of construction shown and described, as indicated in the claims.

In the drawings: Figure 1 is a plan view of an automobile equipped with this invention, the body parts being broken away for disclosing the essential and operating parts.
Fig. 2 is a section at the line, 2—2, on Fig. 1. Fig. 3 is a section at the line, 3—3, on Fig. 2. Fig. 4 is a section at the line, 4—4, on Fig. 1.

In the drawings the chassis or frame work of the automobile to which this invention may be applied is represented by the longitudinal bars, 1,—1, and cross bars, 2.

3 is a shaft journaled on the frame and adapted to be rotated by the motor by any convenient connection which may be understood to be indicated by the sprocket wheel, 4, on said shaft. Mounted loose on this shaft is a brake member which, as illustrated, is a drum, 5, and rigid with the shaft is a gear, 6, which meshes with a gear, 7, on a bearing, 8, independently supported on the frame.

9,—9, are members mounted on the vehicle frame for rotation independently of the vehicle supporting wheels; as illustrated, they are spur wheels or toothed disks adapted for penetrating the surface of the roadway for positive engagement therewith. They are rigid with their shaft, 9ª, which has rigid with it a gear, 10, and said shaft is journaled in a frame, 11, in which there are journaled other wheels, 12 and 13, of a train for actuating said spur wheels, 9,—9. The frame, 11, is mounted in slide-ways, 14—14, in brackets, 15—15, which are rigidly mounted on the running gear-frame for up-and-down movement of the spur wheels, 9, all the train on the frame, 11, partaking of said movement. The gear wheel, 13, is connected with the gear, 7, by a universal-jointed and telescoping shaft, 16, whose universal joints, 17,—17, and extensibility accommodate the up-and-down movement of the gear, 13, while rotary movement is communicated between the two gears by said jointed shaft, 16. The gear, 6, has a clutch member, 6ª, coöperating with a companion clutch member, 6ᶜ, mounted for sliding on the shaft, 3, being feathered on the shaft for rotation therewith. A shipping lever, 18, with connections extending to within reach of the operator engages the clutch member, 6ᶜ, for shifting it to engage and disengage said clutch members. A brake shoe, 19, coöperating with the brake drum, 5, is provided with operating connections extending to a pedal, 20, within convenient reach of the driver's foot.

The frame, 11, is connected by a lever, 22, and operating rod, 22ª, with a pedal, 23, adapted to be operated from the driver's seat for raising and lowering said frame to move the toothed wheels, 9, into and out of engagement with the roadway. A spring, 24, may be provided operating upon the frame to press the toothed wheels downward into engagement with the roadway. When the clutch member 6ᶜ, is disengaged from the wheel, 6, and the brake shoe is out of contact with the brake drum, the operator by means of the pedal, 23, may adjust the frame, 11, to give the toothed wheels, 9, engagement by the roadway for preventing skidding or side-slipping of the vehicle. By applying the brake to the brake drum, the device becomes an emergency brake which operates to retard the vehicle without imposing slipping friction on the tires of the carrying wheels. When it is desirable to assist the traction wheels in hill climbing when the character of the road prevents the traction wheels from obtaining adequate grip while the power is sufficient for the climbing, the operator will shift the clutch, 6ᶜ, to engage the gear, 6, with the shaft, 3, and by this means rotating positively the toothed wheels 9, will obtain direct propulsion by the engagement of these wheels with the roadway. The train connecting these toothed wheels with the shaft wheel, it will be understood, will be constructed to give the toothed wheels a circumferential speed substantially equal to that of the traction wheels.

I claim:

1. A safety device for a motor-driven road vehicle, comprising a member mounted on the vehicle frame for rotation independently of the vehicle-supporting and propelling wheels and adapted for penetrating the surface of the road-bed; a rotating brake member rotatably mounted on the vehicle and a train connecting said road-bed penetrating member with said brake member; a brake-shoe and means for applying it at will to the rotating brake member.

2. A safety device for a motor-driven road vehicle, comprising in combination with a member mounted for rotating independently of the vehicle-supporting and propelling wheels, and adapted for penetrating the surface of the road-bed; a shaft adapted to be rotated by the vehicle motor; a wheel loose on said shaft, and means for engaging it at will with the shaft for rotation thereby, a train operatively connecting said wheel with said road-engaging member, and means for operating the shaft engaging means at will.

3. A safety device for road vehicles, comprising a road-engaging member mounted for rotation independently of the vehicle-supporting and propelling wheels; a brake member mounted on the vehicle frame and a train connecting said brake member with said road-engaging member; a frame in which said road-engaging member and a portion of the train are mounted, said frame being movable up and down to accommodate said road-engaging member to the road-bed, the remainder of the train being mounted on the vehicle frame and a universal-jointed shaft connecting the two portions of the train.

In testimony whereof, I have hereunto set my hand at Chicago, Illinois, this 23rd day of December, 1912.

MELVILLE CLARK.

Witnesses:
   CHAS. S. BURTON,
   LUCY S. STONE.

Copies of this patent may be obtained for five cents each, by addressing the "Commissioner of Patents, Washington, D. C."